US007827053B2

(12) United States Patent
Kalnicki et al.

(10) Patent No.: US 7,827,053 B2
(45) Date of Patent: Nov. 2, 2010

(54) TIRE MARKET FORECASTING METHOD

(75) Inventors: Federico Ariel Kalnicki, Stow, OH (US); Brett Thomas Ponton, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1146 days.

(21) Appl. No.: 11/485,789

(22) Filed: Jul. 13, 2006

(65) Prior Publication Data
US 2008/0015924 A1    Jan. 17, 2008

(51) Int. Cl.
*G06F 17/30* (2006.01)
(52) U.S. Cl. ............................................. 705/10; 705/7
(58) Field of Classification Search ........................ None
See application file for complete search history.

(56) References Cited

U.S. PATENT DOCUMENTS

| | | | | |
|---|---|---|---|---|
| 5,765,143 | A * | 6/1998 | Sheldon et al. ................ | 705/28 |
| 6,324,522 | B2 * | 11/2001 | Peterson et al. ............... | 705/28 |
| 6,449,597 | B1 * | 9/2002 | McGill ........................ | 705/1.1 |
| 6,711,550 | B1 * | 3/2004 | Lewis et al. .................... | 705/10 |
| 6,996,538 | B2 * | 2/2006 | Lucas ........................... | 705/28 |
| 7,080,026 | B2 * | 7/2006 | Singh et al. .................... | 705/10 |
| 7,092,929 | B1 * | 8/2006 | Dvorak et al. ................. | 705/28 |
| 7,213,007 | B2 * | 5/2007 | Grichnik ....................... | 706/21 |
| 7,216,096 | B1 * | 5/2007 | Untiedt et al. ................. | 705/28 |
| 7,277,862 | B1 * | 10/2007 | Adgaonkar et al. ............ | 705/8 |
| 7,523,048 | B1 * | 4/2009 | Dvorak ......................... | 705/10 |
| 7,668,761 | B2 * | 2/2010 | Jenkins et al. ................. | 705/28 |
| 2002/0072956 | A1 * | 6/2002 | Willems et al. ............... | 705/10 |
| 2002/0077979 | A1 * | 6/2002 | Nagata ......................... | 705/40 |
| 2002/0198794 | A1 * | 12/2002 | Williams et al. .............. | 705/28 |
| 2004/0083162 | A1 * | 4/2004 | Sadre ........................... | 705/37 |
| 2005/0114237 | A1 * | 5/2005 | Urso ............................ | 705/28 |
| 2006/0242030 | A1 * | 10/2006 | Blanchard et al. ............. | 705/27 |

FOREIGN PATENT DOCUMENTS

JP       2005251108 A  *  9/2005

OTHER PUBLICATIONS

Alan Greenspan and Darrel Cohen. Motor Vehicle Stocks, Scrappage, and Sales. Oct. 30, 1996. p. 1-34.*
Bass FM (1967). A New Product Growth For Model Consumer Durables. Management Science. 15(5): p. 1-14.*
Translation of JP2005251108 to Yoshioka et al.*

* cited by examiner

*Primary Examiner*—Romain Jeanty
*Assistant Examiner*—Brett Feeney
(74) *Attorney, Agent, or Firm*—Richard B. O'Planick

(57) ABSTRACT

A method for tire market forecasting combines three sub-methods in order to forecast unit volumes for every tire size in the industry or market segment. The method includes deriving a full trend by a first sub-method M1 for a first tire size TS1 based upon a relationship between OE and replacement markets for size TS1; deriving a full trend by a second sub-method M2 for size TS1 based on an estimated vehicle fleet for size TS1; and comparing the first and second full trends to derive a regular forecast. When a tire size does not follow a predictable pattern according to OE assumptions, a full trend is derived by a third sub-method M3 based on an historic replacement market trend adjusted as needed by statistical tools. A vitality calculation may be made calculating present and future vitality V on a market segment or on a selected tire line, and a vitality goal VG may be established whereupon a strategy may be derived identifying tire sizes required and not required to achieve and maintain the goal over time.

11 Claims, 10 Drawing Sheets

TARGET LINES

| BRAND | LINE |
|---|---|
|  |  |
|  |  |
|  |  |
|  |  |
| SIZES | ANNUAL VOLUME |
| 0 | 0 |

TARGET MARKETS    GOAL

|  | Ultra Sport | Sport Auto | Auto | Mini-Van | CUV | SUV | Pickup |
|---|---|---|---|---|---|---|---|
| Luxury | ☐ | ☐ | ☑ | ☐ | ☐ | ☐ | ☐ |
| Mid | ☐ | ☐ | ☑ | ☐ | ☐ | ☐ | ☐ |
| Value | ☐ | ☐ | ☑ | ☐ | ☐ | ☐ | ☐ |
| Aged | ☐ | ☐ | ☑ | ☐ | ☐ | ☐ | ☐ |

50 52

% of Coverage — 54 # of Sizes — 56

Rim: >14 (58)  Speed: <H (60)  Load: SL only (62)  [Calculate] (64)

| Currently In Line | Action Summary Add | Action Summary Kill | Prefix | SW | AR | RIM | OD | Speed | Load | CAGR 2005-2010 | 2005 Volume | 2005 Rank | 2005 Action | 2006 Volume | 2006 Rank | 2006 Action | 2007 Volume | 2007 Rank | 2007 Action | 2008 Volume | 2008 Rank | 2008 Action |
|---|---|---|---|---|---|---|---|---|---|---|---|---|---|---|---|---|---|---|---|---|---|---|
| NO | 2005 | | P & (Blank) | 225 | 60 | 16 | 26.6 | T & Below | SL & LL | -1.3% | 9,561,795 | 1 | ▲ | 9,433,057 | 1 | ▲ | 9,340,882 | 1 | ▲ | 9,215,461 | 1 | ▲ |
| NO | 2005 | | P & (Blank) | 185 | 65 | 14 | 23.5 | T & Below | SL & LL | -17.5% | 7,440,898 | 2 | ▲ | 6,355,114 | 3 | ▲ | 5,371,551 | 3 | ▲ | 4,399,024 | 3 | ▲ |
| NO | 2005 | | P & (Blank) | 205 | 65 | 15 | 25.5 | T & Below | SL & LL | -3.5% | 6,276,932 | 3 | ▲ | 6,384,713 | 2 | ▲ | 6,183,485 | 2 | ▲ | 5,890,087 | 2 | ▲ |
| NO | 2005 | | P & (Blank) | 195 | 70 | 14 | 24.7 | T & Below | SL & LL | -18.5% | 5,362,303 | 4 | ▲ | 4,514,534 | 5 | ▲ | 3,713,025 | 5 | ▲ | 3,031,566 | 13 | ▲ |
| NO | 2005 | | P & (Blank) | 195 | 65 | 15 | 25.0 | T & Below | SL & LL | -8.5% | 5,149,449 | 5 | ▲ | 4,639,137 | 4 | ▲ | 4,191,836 | 4 | ▲ | 3,797,524 | 4 | ▲ |
| NO | 2005 | | P & (Blank) | 205 | 70 | 15 | 26.3 | T & Below | SL & LL | -9.8% | 4,247,310 | 6 | ▲ | 3,819,099 | 6 | ▲ | 3,442,172 | 7 | ▲ | 3,110,392 | 12 | ▲ |
| NO | | | P & (Blank) | 215 | 60 | 16 | 26.2 | T & Below | SL & LL | -4.8% | 3,910,109 | 7 | ▲ | 3,802,454 | 7 | ▲ | 3,599,273 | 6 | ▲ | 3,387,921 | 8 | ▲ |
| NO | | | P & (Blank) | 175 | 70 | 13 | 22.6 | T & Below | SL & LL | -27.5% | 3,413,396 | 8 | ▲ | 2,834,356 | 13 | ▲ | 2,198,817 | 17 | ▲ | 1,640,093 | 20 | ▲ |
| NO | 2005 | | P & (Blank) | 175 | 65 | 14 | 23.0 | T & Below | SL & LL | -10.5% | 3,230,380 | 9 | ▲ | 2,885,710 | 11 | ▲ | 2,582,579 | 15 | ▲ | 2,366,807 | 17 | ▲ |
| NO | 2005 | | P & (Blank) | 205 | 65 | 15 | 25.5 | H & V | SL & LL | 4.0% | 2,919,023 | 10 | ▲ | 3,176,134 | 8 | ▲ | 3,392,209 | 8 | ▲ | 3,571,090 | 6 | ▲ |

TIRE MARKET FORECASTING METHOD

FIELD OF THE INVENTION

The invention relates generally to market forecasting systems and methods and, more particularly, to a method for forecasting a multi-product tire line targeting differentiated market segments.

BACKGROUND OF THE INVENTION

In managing production and inventory levels in many product categories, it is desirable to accurately determine unit volumes for each product in a line into the future. Not only is a prediction of future volume levels valuable from production and inventory level standpoints, but such information may be used to adjust product mix and thereby augment profitability. By way of example, in the tire market, tires of various sizes and performance characteristics are produced, each directed to a particular vehicle category within a segmented market. In order to ascertain the unit volumes for each tire size that will be required to meet the needs of the market into the future, a methodology is required to accurately predict future unit volumes for each tire size. Such a methodology should provide short and long term forecasting of every size in the industry and account for not only original equipment vehicle demand but also replacement market demand. Moreover, the methodology should be capable of estimating vitality of the market segments in order to optimize tire line coverage and allow for line adjustments that can enhance profitability.

Heretofore, no integrated methodology has been achieved that can meet the market forecasting needs of a segmented market. Existing methodologies for predicting future unit volume tire demand typically rely primarily on historical demand (sales) data and/or data generated by the OE (original equipment) manufacturers. Such methodologies, however, achieve a less than satisfactory prediction accuracy because they fail to account for changes in vehicle fleet characteristics, vehicle destruction rates, or tire replacement cycles. In addition, existing methodologies fail to provide a means for forecasting tire sizes that do not follow a predictable pattern. For example, certain market segments, such as the "tuner" market, utilize tires in sizes on unpredictable vehicle types. Such usage cannot be predicted by conventional market forecasting methodologies. Such "exceptional" situations within the market cannot be derived from OE derived data since OE data is typically based on conventional vehicle type-to-tire size assumptions.

Accordingly, the industry is in need of a tire market forecasting method for short and long term forecasting every tire size in the industry. The method should adjust for OE and replacement markets for each given size and be capable of utilization in the exceptional case. An acceptable methodology should further be capable of assessing present and future vitality on a market segment or on a selected tire line so as to determine which sizes should be taken out of a line over time in order to enhance overall profitability.

SUMMARY OF THE INVENTION

According to one aspect of the invention, a method for tire market forecasting combines three sub-methods in order to forecast unit volumes for every tire size in the industry. The method: deriving a full trend by a first sub-method M1 for a first tire size TS1 based upon a relationship between OE and replacement markets for size TS1; deriving a full trend by a second sub-method M2 for size TS1 based on an estimated vehicle fleet for size TS1; comparing the first and second full trends to derive a regular forecast. When a tire size does not follow a predictable pattern according to OE assumptions, a full trend is derived by a third sub-method M3 based on an historic replacement market trend adjusted as needed by statistical tools.

According to another aspect of the invention, a vitality calculation is made calculating present and future vitality V on a market segment or on a selected tire line. In yet another aspect of the invention, a vitality goal VG is established and a strategy for tire sizes required and not required to achieve and maintain the goal over time is derived.

An additional aspect of the invention in performing the first sub-method is selecting a first tire size TS1; determining past OE volume for TS1; determining past replacement volume (REPL) for TS1; measuring past ration of REPL/OE; applying ratio REPL/OE to logarithmic function based on compound annual growth rate to obtain a first trend for a first period P1; repeating for subsequent periods P to derive a full trend for TS1 (TOT1).

A further aspect of the invention in performing the second sub-method is estimating vehicle destruction rate (VDR) over time and tire replacement cycle (TRC); calculating total number of tires to be replaced based on current vehicle fleet and tire replacement cycle; obtaining OE production for past, present and future vehicles; estimating total TS1 tires to be replaced over future time (TOT2); comparing TOT1 to TOT2 to derive regular forecast (RF).

Another aspect of the invention in performing the third sub-method is determining historic replacement market trend for T(IRR)1; predicting TOT3 for T(IRR)1 based on historic replacement trend; comparing TOT1, TOT2, and TOT3 to determine if tire is an irregular case; adjusting TOT1 and TOT2 by TOT3 if necessary.

The vitality V calculation, pursuant to another aspect of the invention, is made by segmenting tire sizes within a value-to-vehicle type matrix; segmenting each irregular size case separately; running forecasting models for sub-methods M1, M2, M3 (if necessary) for every tire size; calculating present and future vitality V on a market segment and/or selected tire lines. In another aspect of the invention, a vitality goal VG1 is selected; a determination of tire sizes required to achieve VG1 pursuant to a strategy of adding and/or subtracting tire sizes is made; and a determination of tire size requirements to sustain VG1 is made over time.

BRIEF DESCRIPTION OF THE DRAWINGS

The invention will be described by way of example and with reference to the accompanying drawings in which:

FIG. 5 is an example of a table work sheet identifying target lines;

FIG. 6 is an example of a table identifying target markets;

FIG. 8 is an example of a strategy for optimizing tire lines and segment coverage over time.

DETAILED DESCRIPTION OF THE INVENTION

Figure 1:
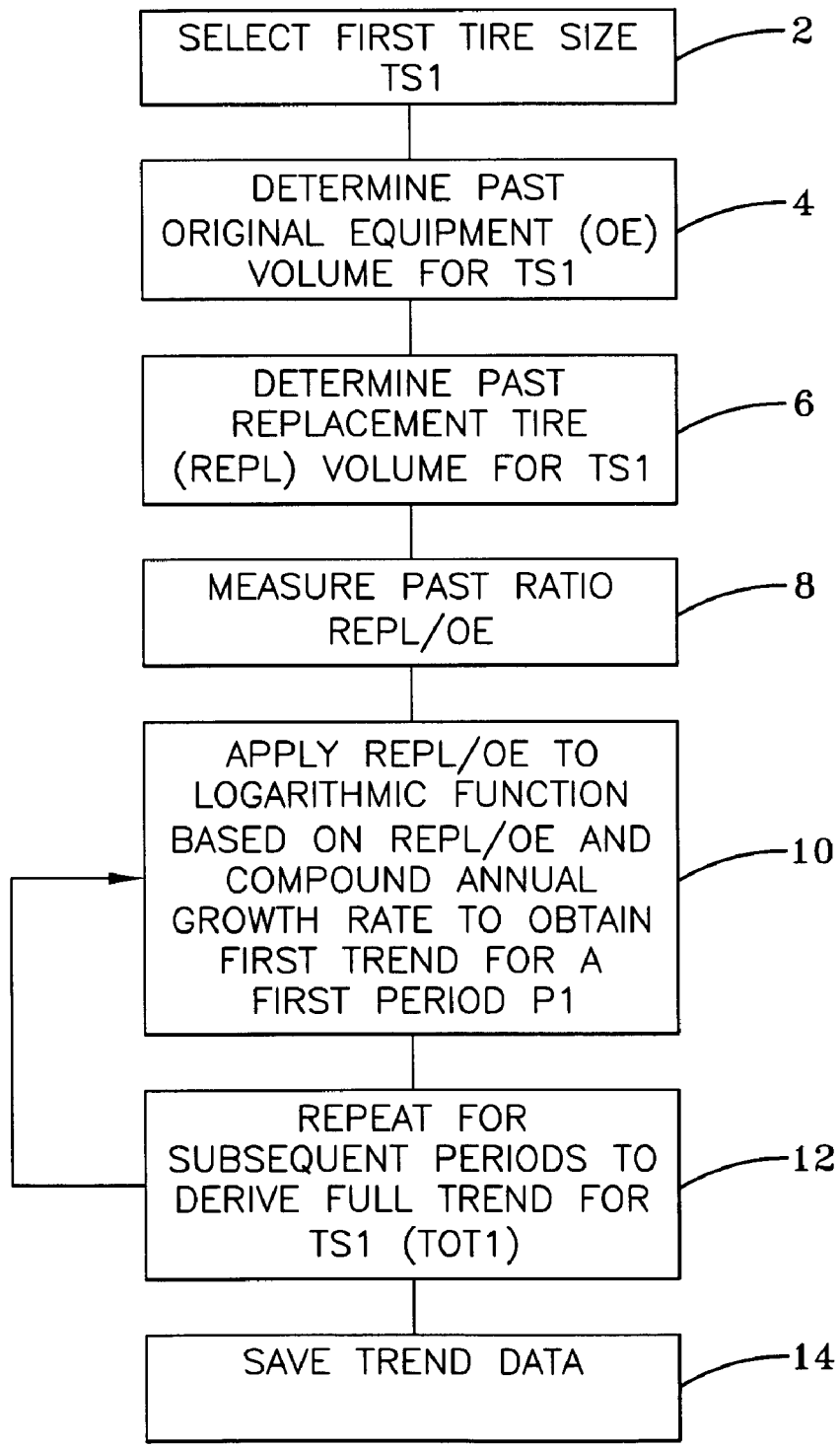
FIG. 1 is a block level diagram of a first forecast method M1.
Figure 2:
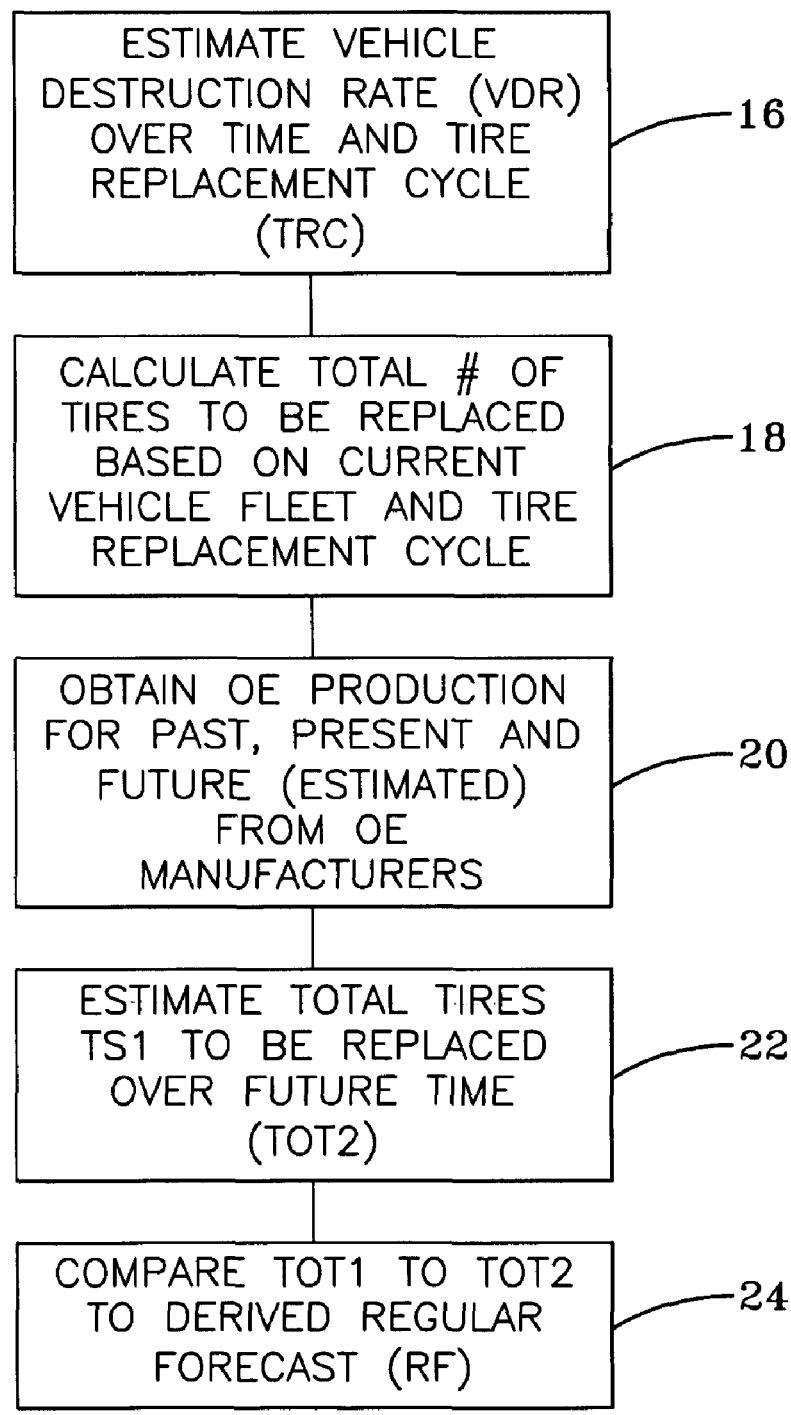
FIG. 2 is a block level diagram of a second forecast method M2.
Figure 3:
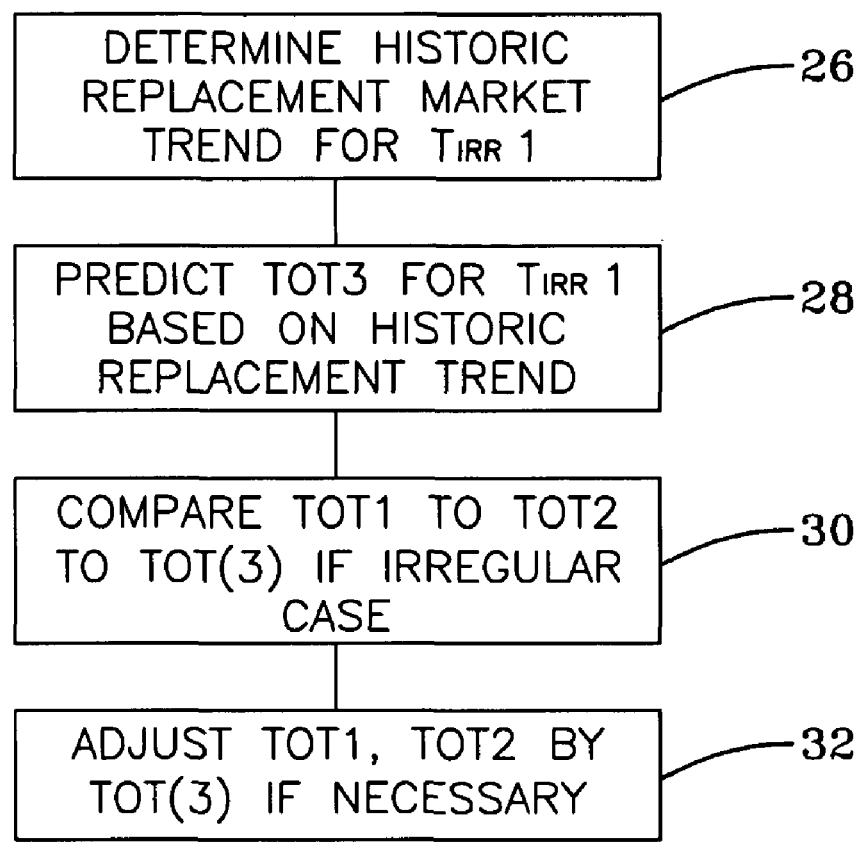
FIG. 3 is a block level diagram of a third forecast method M3.

Referring initially to FIGS. 1-3, the subject method for tire market forecasting has as a goal the estimation of short and long-term industry trends on sizes and the segmentation of the market on target size. The subject method incorporates two (FIGS. 1 and 2), and when necessary a third (FIG. 3), sub-methods to estimate industry trends by tire size. Data required for the method is available from common industry sources and includes historic and forecast information on tire sizes from original equipment (OE) manufacturers; tire offerings offered by every competitor in the industry, OE fitments, pricing, and vitality of the tire line of interest. The method is an integrated view of the marked and may be run on conventional software that is commonly available such as an Excel spreadsheet program. The multiple sources of data are combined and the methodology is explicit and objective.

Figures 9, 10:
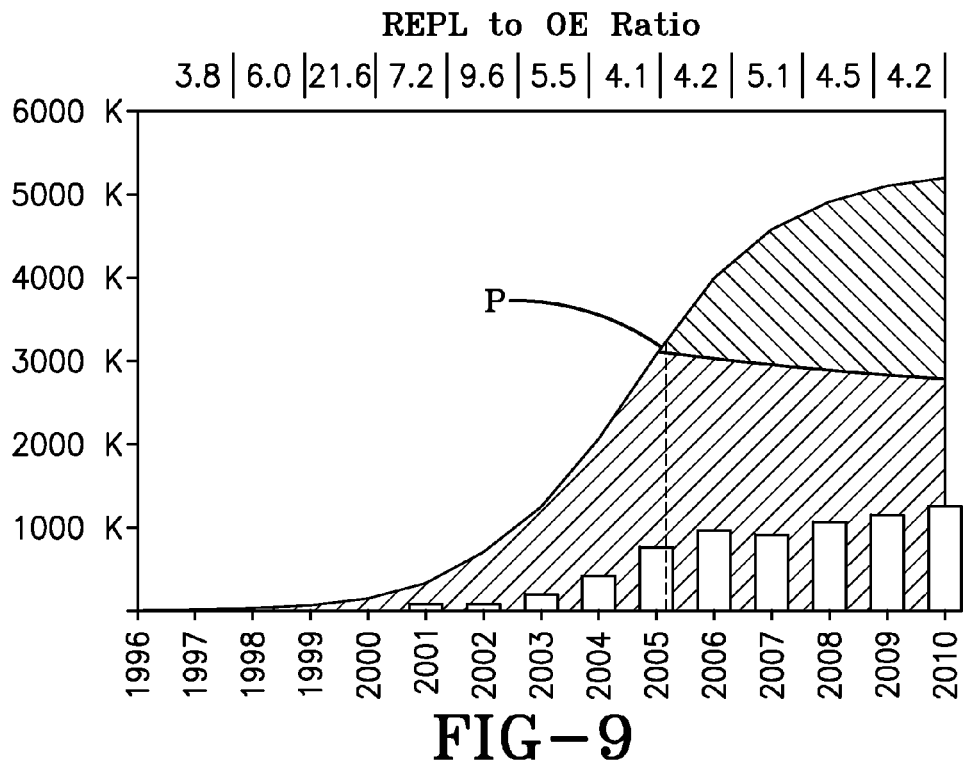
FIG. 9 is an example of a graph of replacement to OE ratio over time.
FIG. 10 is a table of vehicle segmentation for reference year 2006.
Figure 11:
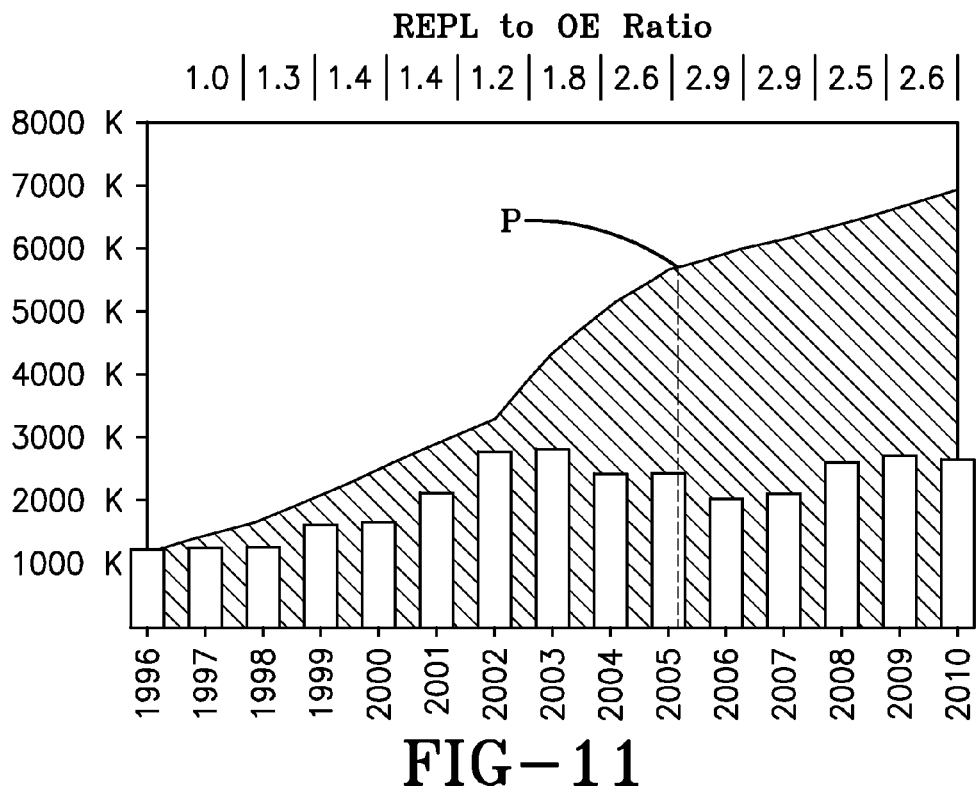
FIG. 11 is graph of replacement to OE ratios over time.
Figure 13:
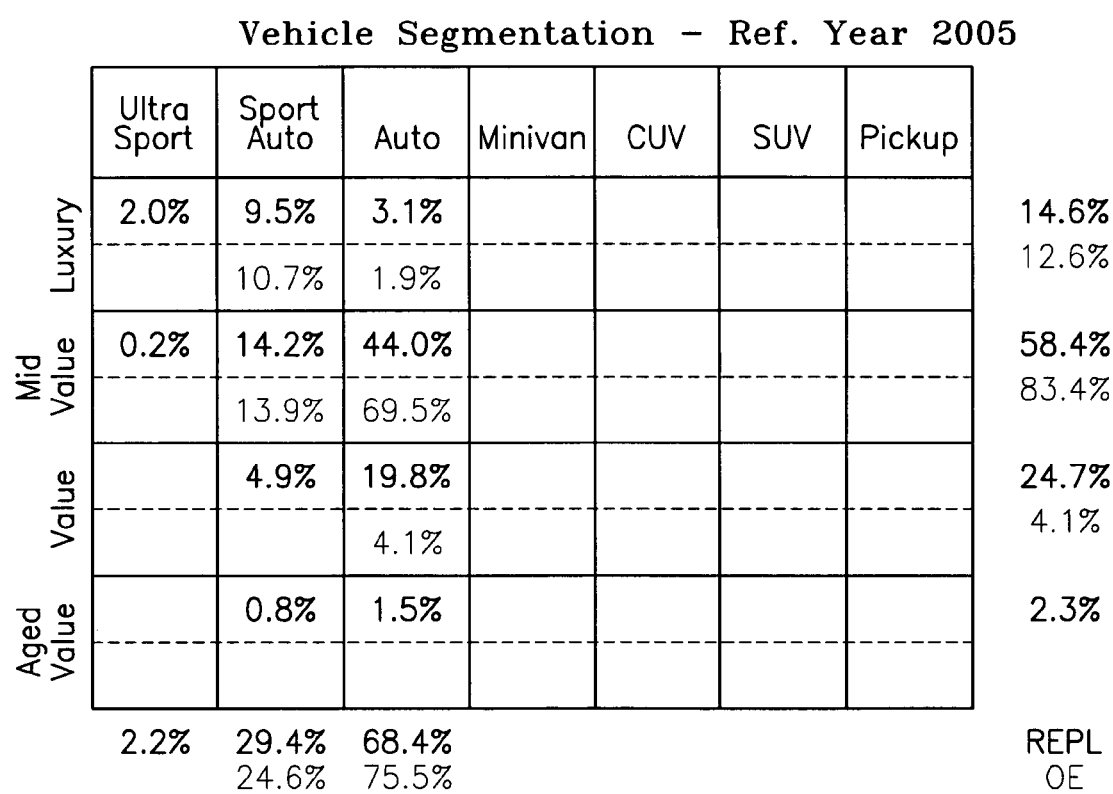
FIG. 13 is a chart of vehicle segmentation for reference year 2005.

With references to FIGS. 1, 10 and 13, the first sub-method is based on the particular relationship between the OE and Replacement Markets for a given tire size. FIGS. 10 and 13 show by way of example vehicle segmentation by reference year (2005) for two representative tires of respective sizes. The chart segments the market by vehicle type and value. Values of vehicles are classified as either luxury, mid-value, value, or aged value. The percentages within each cell are the OE (bottom number) and replacement markets (top number) for each value category. The total percentages across all vehicle categories is summarized along the column at the far right. Thus, for example in FIG. 13, in the luxury category, 14.6% of the tires is the replacement market for a given tire size and 12.6% is OE market. In the mid-value vehicle category, 58.4% is the replacement market and 83.4% is the OE market, etc. The ratio of REPL/OE is thus measured and may be represented in graph form as shown in FIGS. 9 and 11 for two representative tire sizes. For example FIG. 9 illustrates the change in REPL to OE ratio over time. Point P in FIG. 9 is the point at which historical data ends and prediction starts.

The first forecasting sub-method as shown in FIG. 1 consists of selecting a first tire size TS1 (2); determining (4) past original equipment (OE) volume for TS1; determining (6) past replacement volume (REPL) for TS1; measuring (8) past ratio of REPL/OE; applying (10) ratio REPL/OE to a logarithmic function based on compound annual growth rate to obtain a first trend for a first period P1; repeating (12) for subsequent periods P to derive the full trend for TS1; and saving the full trend forecast data thus generated for future use. The first sub-method M1 of FIG. 1, as shown in the graph of FIG. 9, thus forecasts a combined OE and replacement market demand for tires of the selected size in the year 2006 of 4000K tires.

The second sub-method M2 is shown in FIG. 2 to include estimating (16) vehicle destruction rate (VDR) over time and tire replacement cycle (TRC); calculating (18) total number of tires to be replaced based on current vehicle fleet and tire replacement cycle; obtaining (20) OE production for past, present and future vehicles; estimating (22) total TS1 tires to be replaced over future time (TOT2); comparing (24) TOT1 to TOT2 to derive regular forecast (RF) based upon a comparison of the M1 and M2 trends. The second methodology thus is based on estimated vehicle fleet for a given size. The total vehicle fleet for a given year is calculated based on two variables: 1) Vehicle Destruction Rate over time and 2) Tire Replacement Cycle. Both variables are estimations. Following an escalating procedure on OE production for past, present and future years (external data source commonly available and utilized by the industry), the method estimates the cumulative total of tires to be replaced in coming years. The trend obtained is then compared to the one obtained using the first methodology and the combination of both gives what is termed herein the "Regular Forecast" or "RF".

Figure 12:
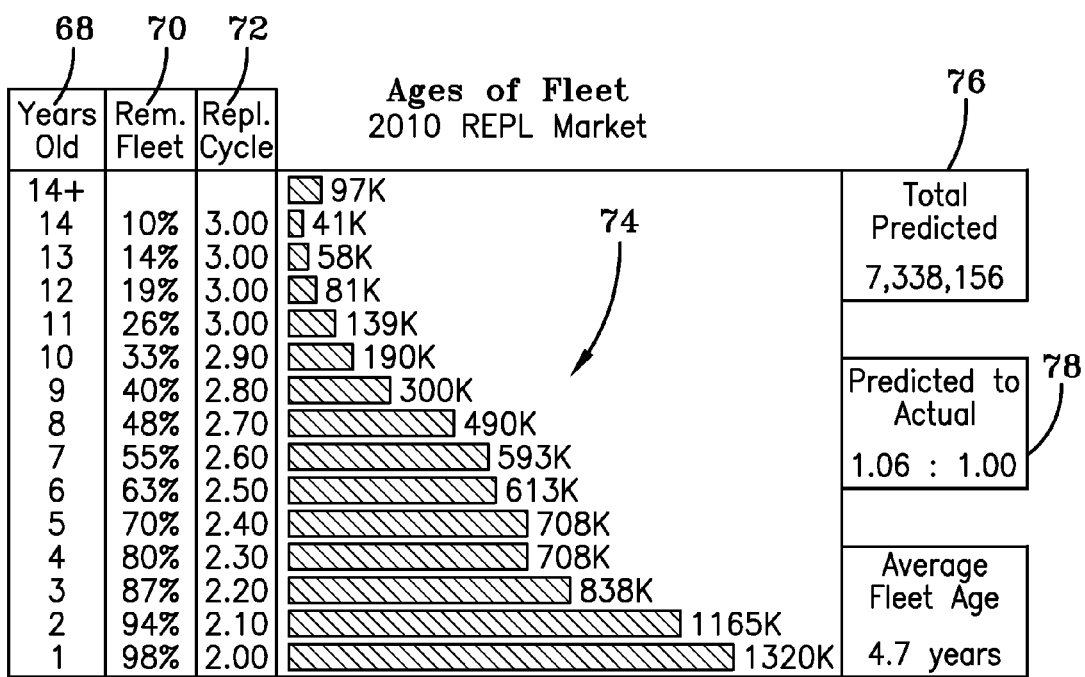
FIG. 12 is a bar graph of ages of fleet for the 2010 replacement market.

FIG. 12 illustrates in graph form the M2 sub-method results for a tire size. As shown therein, the left column 68 represents the yearly age of the fleet utilizing the tire size; column 70 the percentage of the fleet remaining in each year of a vehicle's life; column 72 the replacement cycle of the tires for the fleet based on how old the vehicle is and the estimated corresponding mileage on the fleet vehicles. The number of tires 74 is shown in bar graph form and gives the number of replacement tires that will be in demand. Total predicted tires 76 may be calculated and the ratio of predicted to actual 78 may be estimated (1.06 to 1.0 in the example of FIG. 12). The average fleet age 80 is also estimated.

The trend obtained by M2 is then compared to the M1 trend as discussed above. When a tire size does not follow a predictable pattern derived from an OE origin, a third sub-method M3 is required. For example, in the tuner market segment a larger tire than an OE would expect may be used on a particular vehicle, resulting in a larger aggregate demand for that tire size than the OE would expect. M1 and M2 sub-methods would not be good predictors of future demand in such an "exceptional" or "unpredictable" case. The third methodology M3 takes in consideration particular actual world behaviors and estimates a trend based on the Historic Replacement Market trend. The M3 method follows an historic trend adjusted by a calculation following a bell shape in cases where there is little information or the output based on pure historic trends is not realistic.

The M3 sub-method is shown in FIG. 3 to include determining (26) historic replacement market trend for T(Irr)1; predicting (28) TOT3 for T(Irr)1 based on historic replacement trend; comparing (30) TOT1 to TOT2 to TOT3 if the tire size appears to be irregular case; and adjusting (32) TOT1, TOT2 by TOT3 if necessary. FIGS. 9 and 11 show representative graphs of REPL to OE ratios over time for a particular tire size. Should historic replacement trends from such graphs appear distorted or irregular, such that the ratios do not work for certain tire sizes, the tire sizes will be identified as "irregular" or "unpredictable" and the graphs for such tire sizes will require adjustment. The method M3 will adjust the calculation following a bell shape.

It is a further aspect of the invention to conduct Vitality calculations based upon the M1, M2, and M3 (if necessary) forecasts. As used herein, "Vitality" is defined as the target market coverage that a particular Tire Brand/Line has with its portfolio of tire-sizes. To calculate Vitality, certain steps must be completed beforehand. First, segmentation of tire sizes must be conducted. The vehicle population may be segmented manually based upon a matrix such as the 28 matrix segmentation of FIG. 13. Following the same logic used with the M2 sub-method forecasting, the subject method obtains the segmentation for every tire size that has an OE origin, by year. As discussed previously, irregular tire sizes are segmented manually and forecasted pursuant to sub-method M3. A forecast is then run for every tire size in the industry. Having a forecast and a segmentation for every tire size now allows for a calculation of the present and future vitality on a market segment or on a selected tire line. By selecting a Vitality Goal (VG), the method recommends which sizes should be incorporated to achieve that goal, and how to maintain that level over time. Vitality calculation further shows which sizes should be taken out of a line over time.

Figure 4:
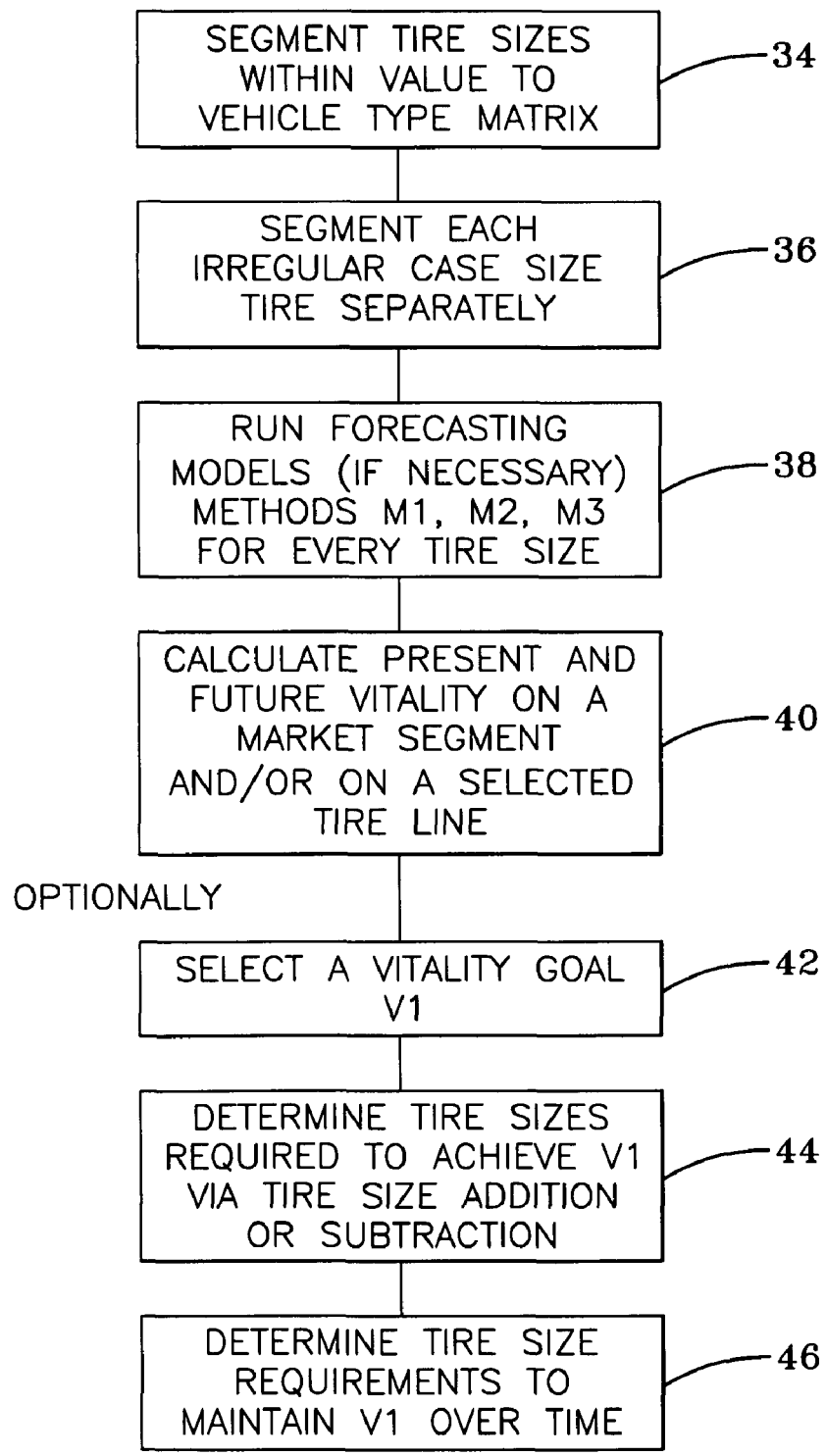
FIG. 4 is a block level diagram of a vitality calculation method.

FIG. 4 shows the Vitality Calculation V as segmenting (34) tire sizes within a value-to-vehicle type matrix; segmenting (36) each irregular size tire case separately; running (38) forecasting models for sub-methods M1, M2, and M3 (if necessary, i.e. when a tire size is irregular) for every tire size; calculating (40) present and future vitality V on a market segment or selected tire lines. Optionally, as a planning tool, the Vitality Calculation may be utilized further by selecting (42) a vitality goal V1; and determining (44) tire sizes required to achieve the vitality goal by adding or subtracting tire sizes over time. It may also be desirable to determine (46) tire size requirements to maintain V1 over time.

Figure 7:
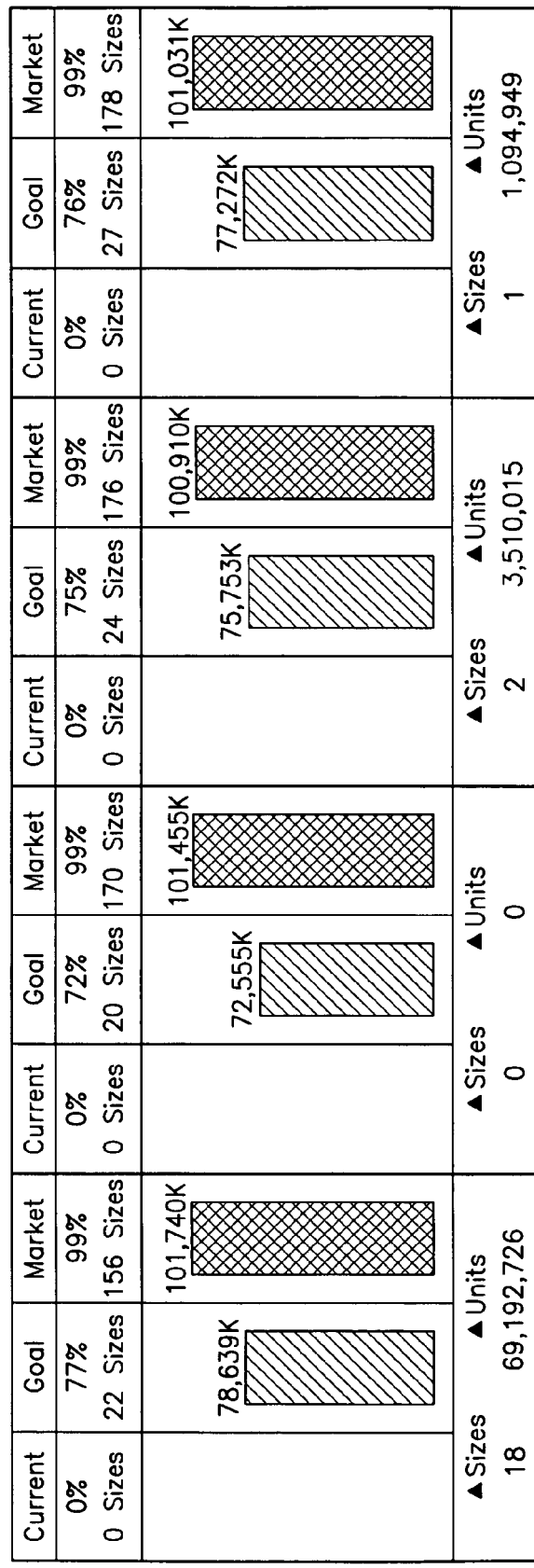
FIG. 7 is an example of table identifying tire size goals versus market.

FIG. 5 shows a matrix form 48 that identifies industry brands and lines by sizes. The annual volume for each size is specified. FIG. 6 uses the same 28 market segmentation grid as before, to establish a vitality goal for each target market 50. The goal 52 is set for each target market as a % of coverage 54. The number of sizes of tires 56 may be further specified to reach the goal. Further limitations may be set, such as rim size 58, speed ? ( what is this?), load 62 (? What does this refer to in FIG. 6?). The vitality calculation 64 may then be conducted by computer spreadsheet to determine a strategy such as indicated in FIG. 8. FIG. 7 represents a strategy summary chart in which alternative goals are set as a percentage of the market. It will be noted that the number of tire sizes required to meet the set goal will vary as will the number of units. FIG. 8 is a chart showing a strategy for achieving a vitality goal. The strategy lists each tire size in the industry. The FIG. 8 chart specifies whether a particular size is currently in the line 82 of the manufacturer; an action summary 84 of whether to add the size or eliminate the size; columns 86 specifying-further tire-specific information; speed 88 and load 90 specifications for each tire size; and by year an action plan setting forth the volume of each tire size is to be produced in each year and the rank of that action as it relates to other action items. Each year thus is provided with a blueprint of prioritized action plans for each tire size in the line and instructions on which tire size to add or eliminate in order to achieve the vitality goal initially, and to preserve the desired vitality over time.

From the foregoing, it will be apparent that the subject forecasting method takes into account OE fitments carrying a target tire size. The method further accounts for the competitive landscape on each tire size and the tire size offerings of the manufacturer utilizing the tool. The method combines alternative sub-methods M1, M2, and M3 where needed as a cross-check on the forecasting veracity. The vitality of the product line may be calculated and a strategy derived for attaining a vitality goal and maintaining that goal over time through the addition and subtraction of tire sizes from the product line.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for tire market forecasting comprising:
a. deriving by utilizing a data processing apparatus a full trend by a first sub-method for a first tire size based upon a relationship between original equipment and replacement markets for first tire size tires, including;
determining past original equipment volume for the first tire size tires;
determining past replacement volume for the first tire size tires;
measuring past ratio of replacement volume/original equipment;
applying ratio replacement volume/original equipment to a logarithmic function
based on compound annual growth rate to obtain a first trend for a first period;
repeating for subsequent periods to derive the full trend for the first tire size;
b. deriving by utilizing the data processing apparatus a full trend by a second sub-method for the first tire size in an estimated vehicle fleet for first tire size tires, including;
estimating vehicle destruction rate over time and tire replacement cycle;
calculating total number of tires to be replaced based on current vehicle fleet and tire
replacement cycle;
obtaining original equipment production data for past, present and future vehicles;
estimating total first tire size tires to be replaced over a future time period;
comparing the full trend for the first tire size derived by the first sub-method for a first
tire size to the full trend derived by the second sub-method for the first tire size to derive a regular forecast; and
c. deriving by utilizing the data processing apparatus the first tire size regular forecast.

2. The method according to claim 1, further comprising repeating steps a, b, and c for additional tire sizes in at least one tire line.

3. The method according to claim 1, further comprising: characterizing the first tire size as an irregular size when the first tire size does not follow a predictable pattern; and deriving a full trend for the first tire size by a third sub-method based on a statistically adjusted historic replacement market trend tire size.

4. The method according to claim 3, further comprising: calculating present and future vitality on a market segment or on a selected tire line; establishing a vitality goal; and deriving a strategy for tire sizes required and not required to achieve and maintain the goal over time.

5. The method according to claim 4, wherein the calculation of vitality comprises:
segmenting tire sizes within a value-to-vehicle type matrix; segmenting each irregular size tire case separately; running forecasting models for the first, second and third sub-methods when a tire size is irregular for every tire size; calculating present and future vitality on a market segment or selected tire lines; determining tire sizes required to achieve the vitality goal by adding or subtracting tire sizes over time.

6. The method according to claim 1, wherein the first sub-method comprises:
determining past original equipment volume for the first tire size;
determining past replacement volume for the first tire size; measuring past ratio of replacement volume/original equipment; applying ratio replacement volume/original equipment to a logarithmic function based on compound annual growth rate to obtain a first trend for a first period; repeating for subsequent periods to derive the full trend for the first tire size.

7. The method according to claim 1, wherein the second sub-method comprises:

estimating vehicle destruction rate over time and tire replacement cycle; calculating total number of tires to be replaced based on current vehicle fleet and tire replacement cycle; obtaining original equipment production for past, present and future vehicles; estimating total first tire size tires to be replaced over future time; comparing a current replacement total to tires to be replaced over future time to derive regular forecast.

8. A method for tire market forecasting comprising:

a. deriving a full trend by utilizing a data processing apparatus by a first sub-method for a first tire size based upon a relationship between original equipment and replacement markets for first tire size tires, including;

determining past original equipment volume for the first tire size tires;

determining past replacement volume for the first tire size tires;

measuring past ratio of replacement volume/original equipment;

applying ratio replacement volume/original equipment to a logarithmic function based on compound annual growth rate to obtain a first trend for a first period;

repeating for subsequent periods to derive the full trend for the first tire size;

b. deriving by utilizing the data processing apparatus a full trend by a second sub-method for the first tire size in an estimated vehicle fleet for first tire size tires, including;

estimating vehicle destruction rate over time and tire replacement cycle;

calculating total number of tires to be replaced based on current vehicle fleet and tire replacement cycle;

obtaining original equipment production data for past, present and future vehicles;

estimating total first tire size tires to be replaced over a future time period;

comparing the full trend for the first tire size derived by the first sub-method for the first tire size to the full trend derived by the second sub-method for the first tire size;

determining that the first tire size does not follow a predictable pattern; and c. deriving an irregular forecast by the processing apparatus including;

applying a third sub-method that includes adjusting, by a statistically adjusted historic replacement market trend, the full trend of the first tire size derived by the first sub-method for the first tire size and the full trend of the first tire size derived by the second sub-method; and deriving the first tire size irregular forecast.

9. The method according to claim 8, further comprising repeating steps a, b, and c for additional tire sizes in at least one tire line.

10. The method according to claim 8, further comprising: calculating present and future vitality on a market segment or on a selected tire line; establishing a vitality goal; and deriving a strategy for tire sizes required and not required to achieve and maintain the goal over time.

11. The method according to claim 10, wherein the calculation of vitality comprises:

segmenting tire sizes within a value-to-vehicle type matrix; segmenting each irregular size tire case separately; running forecasting models for sub-methods one, two, and three when a tire size is irregular for every tire size; calculating present and future vitality on a market segment or selected tire lines; determining tire sizes required to achieve the vitality goal by adding or subtracting tire sizes over time.

* * * * *